US012617375B2

(12) United States Patent
Katayama

(10) Patent No.: US 12,617,375 B2
(45) Date of Patent: May 5, 2026

(54) OPERATION PEDAL DEVICE FOR VEHICLE

(71) Applicant: TOYODA IRON WORKS CO., LTD., Aichi (JP)

(72) Inventor: Takuya Katayama, Aichi (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 107 days.

(21) Appl. No.: 18/577,428

(22) PCT Filed: Sep. 7, 2022

(86) PCT No.: PCT/JP2022/033560
§ 371 (c)(1),
(2) Date: Nov. 14, 2024

(87) PCT Pub. No.: WO2023/058390
PCT Pub. Date: Apr. 13, 2023

(65) Prior Publication Data
US 2025/0276673 A1 Sep. 4, 2025

(30) Foreign Application Priority Data

Oct. 6, 2021 (JP) ................................. 2021-164506

(51) Int. Cl.
*B60T 7/06* (2006.01)
*G05G 1/327* (2008.04)
(52) U.S. Cl.
CPC .............. *B60T 7/065* (2013.01); *G05G 1/327* (2013.01)

(58) Field of Classification Search
CPC ................................. B60T 7/065; G01G 1/327
See application file for complete search history.

(56) References Cited

U.S. PATENT DOCUMENTS 7,614,320 B2 * 11/2009 Fukase ................... G01L 5/225
74/516
2007/0137398 A1 6/2007 Tokumo et al.
2007/0234841 A1 10/2007 Tokumo et al.
2008/0000709 A1 1/2008 Tanigawa et al.
(Continued)

FOREIGN PATENT DOCUMENTS

CN 1966300 A 5/2007
CN 111316190 A 6/2020
(Continued)

OTHER PUBLICATIONS

USPTO Machine Translation (retrieved from FIT database) of the Description of KR 101710542 B1, Yang et al., Mar. 13, 2017. (Year: 2025).*

(Continued)

*Primary Examiner* — Daniel D Yabut
(74) *Attorney, Agent, or Firm* — Millen, White, Zelano & Branigan P.C.; Miki Motohashi Iino

(57) ABSTRACT
When a dash panel P is displaced toward the rear of a vehicle upon vehicle collision, a small collision lever 60 is displaced to a release position at which a load corresponding to contact of a collision bracket 200 with a second contact portion 60A is applied to a swaging pin 15. When fixation between a rotation lever 50 and a second arm 40 via the small collision lever 60 by the swaging pin 15 is released, a step portion 21 is displaced to the vehicle front side.

7 Claims, 8 Drawing Sheets

(56)　　　　　　　References Cited

U.S. PATENT DOCUMENTS

| | | | |
|---|---|---|---|
| 2016/0244033 A1* | 8/2016 | Uchida | .................. G05G 1/327 |
| 2017/0297542 A1* | 10/2017 | Kitaguchi | ................. B60T 7/06 |
| 2019/0092289 A1* | 3/2019 | Abe | ........................ B60T 7/065 |
| 2020/0241587 A1 | 7/2020 | Tsuguma | |
| 2022/0219653 A1 | 7/2022 | Abe et al. | |

FOREIGN PATENT DOCUMENTS

| | | | |
|---|---|---|---|
| CN | 113168203 A | 7/2021 | |
| DE | 102004012832 A1 * | 10/2005 | ............ B60R 21/09 |
| JP | 2001097191 A | 4/2001 | |
| JP | 2007276729 A | 10/2007 | |
| JP | 2008001281 A | 1/2008 | |
| JP | 2010224651 A | 10/2010 | |
| JP | 2017-224221 A | 12/2017 | |
| JP | 2020-057274 A | 4/2020 | |
| JP | 2020-083023 A | 6/2020 | |
| JP | 2020-095373 A | 6/2020 | |
| KR | 10-1710542 B1 | 3/2017 | |
| WO | WO-2013136166 A1 * | 9/2013 | ............ B60R 21/09 |

OTHER PUBLICATIONS

International Search Report dated Nov. 15, 2022, filed in PCT/JP2022/033560.

Office Action issued on Jan. 15, 2026 for the corresponding CN Patent Application No. 202280037031.7.

* cited by examiner

UPPER

FRONT ← → REAR

LOWER

*FIG. 6*

UPPER

FRONT ⟷ REAR

LOWER

1

OPERATION PEDAL DEVICE FOR VEHICLE

TECHNICAL FIELD

The present invention relates to a vehicular operation pedal device, which suppresses a step portion of an operation pedal mechanism from moving back to a vehicle rear side when a vehicle component is displaced to the vehicle rear side due to a vehicle collision (hereinafter, it is referred to as "prevention of backward movement of the step portion of the operation pedal mechanism upon vehicle collision").

BACKGROUND ART

Patent Literature 1 describes a vehicular operation pedal device, which realizes prevention of backward movement of a step portion. The vehicular operation pedal device includes a support member, the step portion, an operation pedal, a rotation lever holding an operating rod, and a fixing member. The rotation lever is supported by a rotation shaft member so as to be rotatable relative to the operation pedal, and is fixed to the operation pedal by the fixing member. Upon vehicle collision, a first vehicle component to which the support member is fixed moves back to a vehicle rear side, and the rotation lever contacts a second vehicle component. Accordingly, a predetermined load acts on the fixing member via the rotation lever, and the fixing member releases the fixation between the rotation lever and the operation pedal. With this configuration, the rotation lever rotates to the vehicle front side, preventing the step portion from moving back to the vehicle rear side.

CITATION LIST

Patent Literature

Patent Literature 1: JP-A-2020-095373

SUMMARY OF INVENTION

Problems to be Solved by Invention

In the vehicular operation pedal device described in Patent Literature 1, it is necessary to make a load for releasing the fixation between the rotation lever and the operation pedal by the fixing member greater than a load applied to the fixing member when stepping operation is performed on the step portion. For this reason, it is necessary to design, e.g., the rotation shaft position and shape of each lever in consideration of two loads which are a load applied to the fixing member via the rotation lever by the stepping operation relative to the step portion and a load applied to the fixing member via the rotation lever upon vehicle collision. Thus, there is a concern that the degree of flexibility in design for a vehicular operation pedal device is lowered.

The present invention has been made in view of the above-described problems, and it is an object of the present invention to provide a vehicular operation pedal device, which is configured so that the degree of flexibility in design can be enhanced in the vehicular operation pedal device that achieves prevention of backward movement of a step portion of an operation pedal mechanism upon vehicle collision.

Solution to Problems

A vehicular operation pedal device as disclosed in the present specification to solve the above-mentioned problem includes a support member fixed to a first vehicle component, an operation pedal mechanism provided on the support member and having a step portion that is rotatable relative to the support member and an operation lever that rotates toward a vehicle front side when the step portion is stepped on toward the vehicle front side, a rotation lever having a first contact portion extending to a vehicle rear side, supported on a vehicle lower side with respect to the first contact portion by a first rotation shaft portion so as to be rotatable toward the vehicle front side relative to the operation lever, and holding an operating rod protruding to the vehicle rear side from the first vehicle component, a differential lever having a second contact portion extending to the vehicle rear side and supported on the vehicle lower side with respect to the second contact portion so as to be rotatable toward the vehicle front side relative to the rotation lever by a second rotation shaft portion, and a fixing member that fixes the differential lever and the operation lever. The differential lever is, when fixed to the operation lever by the fixing member, at a restriction position at which the second contact portion protrudes to the vehicle rear side beyond the first contact portion of the rotation lever. When the first vehicle component is displaced toward the vehicle rear side upon vehicle collision, a second vehicle component positioned on the vehicle rear side with respect to the first vehicle component contacts the second contact portion, so that the second contact portion is positioned on the vehicle front side with respect to the first contact portion, and the differential lever is displaced to a release position at which a load corresponding to contact of the second vehicle component with the second contact portion is applied to the fixing member, and fixation between the differential lever and the operation lever by the fixing member is released, so that the second vehicle component contacts the first contact portion and the rotation lever rotates toward the vehicle front side at the first rotation shaft portion.

Effects of Invention

According to the present invention, it is possible to provide a vehicular operation pedal device, which has a high degree of flexibility in design in the vehicular operation pedal device that achieves prevention of backward movement of the step portion.

BRIEF DESCRIPTION OF DRAWINGS

FIG. 6 is a side view illustrating the outline configuration of the brake pedal device;

DESCRIPTION OF EMBODIMENTS

Hereinafter, a vehicular operation pedal device will be described by taking a brake pedal device for a common use brake as an example. In each drawing used in the following description, part of a basic configuration is omitted, and the dimensional ratios, etc. of the illustrated elements are not necessarily accurate.

In the following description, the brake pedal device will be described using a direction in a state where the brake pedal device is mounted on a vehicle. Specifically, the front of the vehicle will be described as "vehicle front," the rear will be described as "vehicle rear," the upper side of the vehicle will be described as "vehicle upper," and the lower side of the vehicle will be described as "vehicle lower." The left-and-right direction of the vehicle will be referred to as a "vehicle width direction." In each figure, the "vehicle front" is simply referred to as "front," the "vehicle rear" is simply referred to as "rear," the "vehicle upper" is simply referred to as "upper," and the "vehicle lower" is simply referred to as "lower." One side in the "vehicle width direction" will be described as "left," and the other side will be described as "right."

(1-1) Outline of First Embodiment

Figure 1:
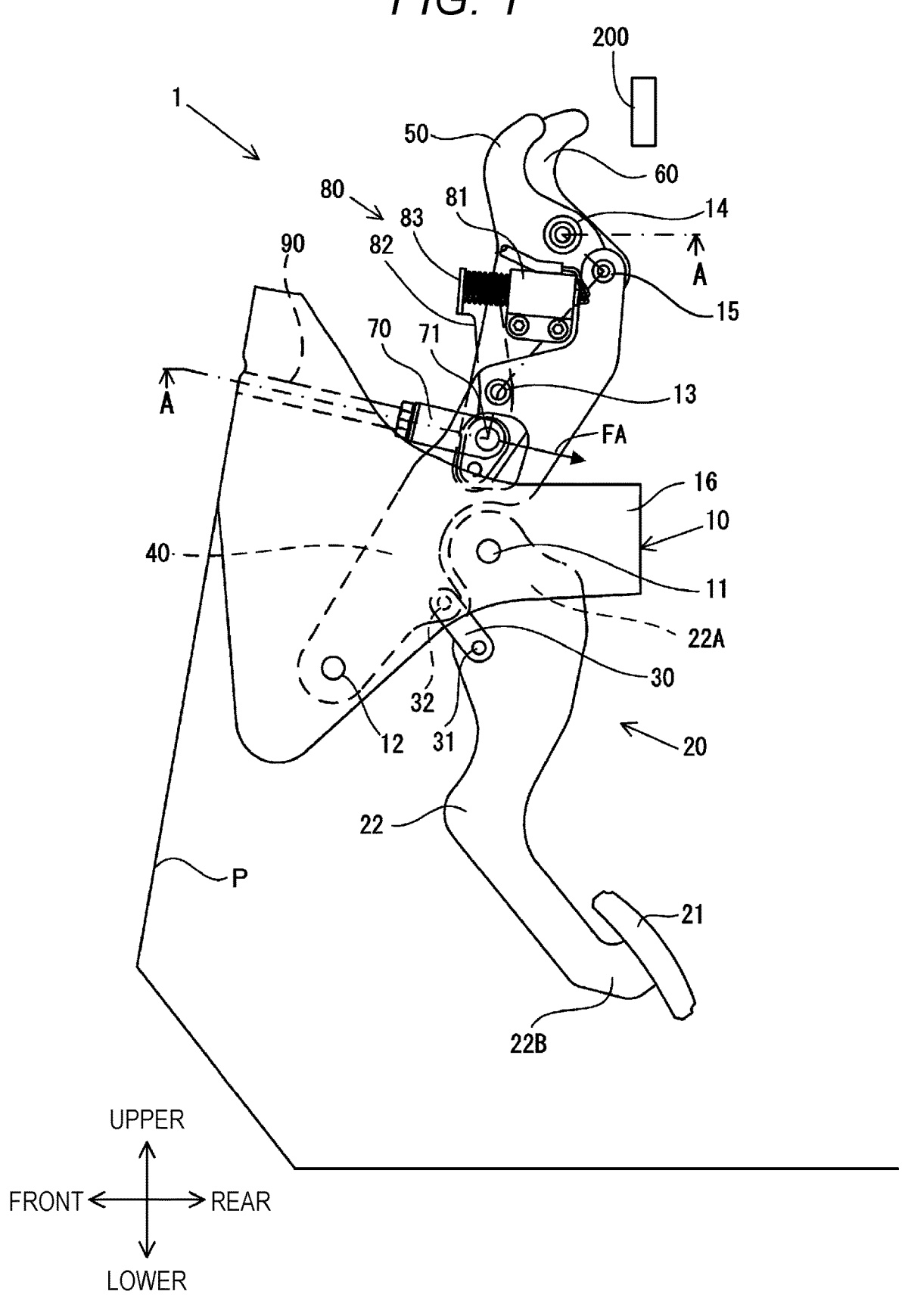
FIG. 1 is a side view illustrating an outline configuration of a brake pedal device according to a first embodiment.
Figure 2:
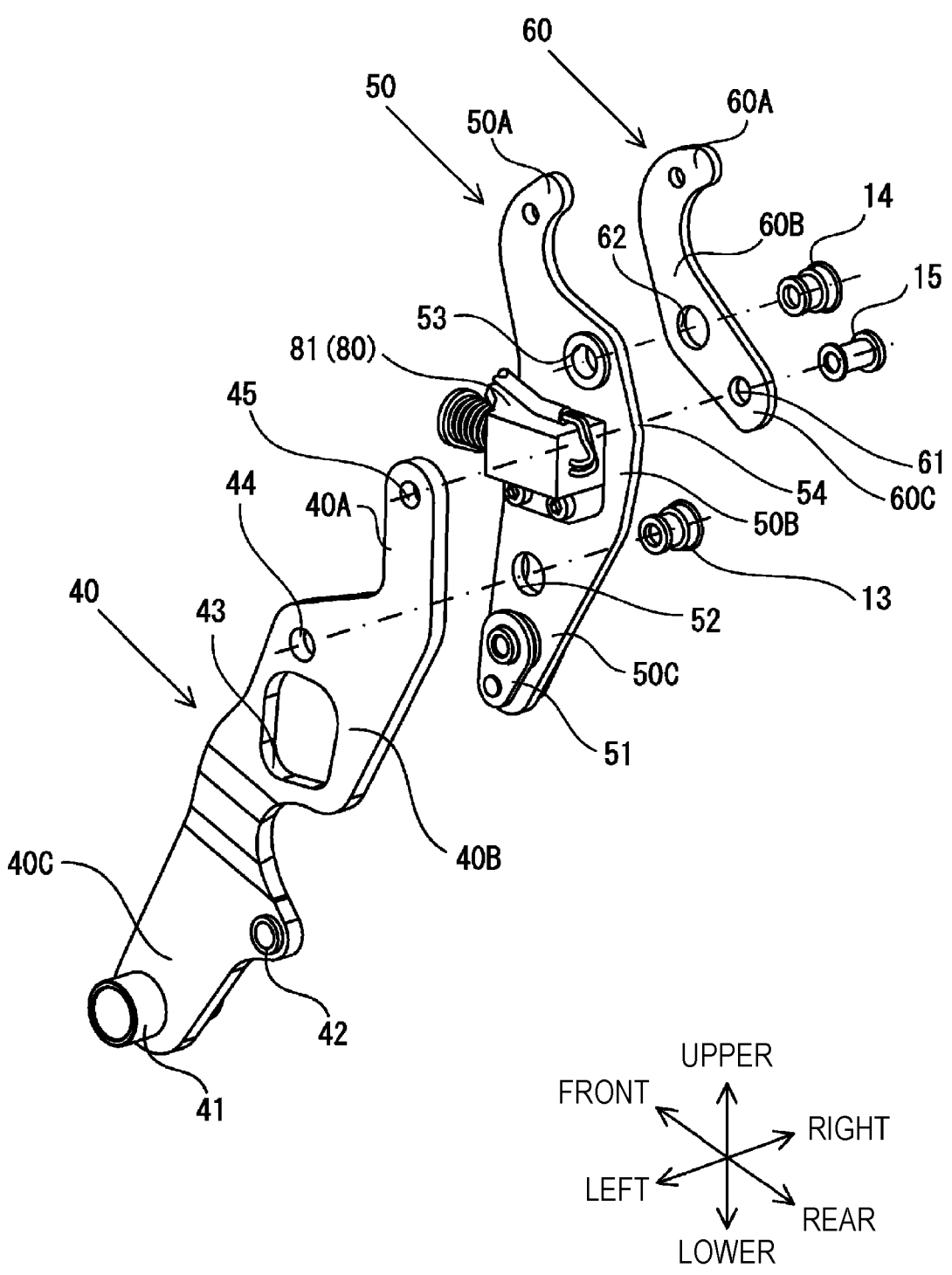
FIG. 2 is an exploded view of part of the brake pedal device.

As illustrated in FIGS. 1 and 2, a brake pedal device 1 mainly includes a pedal bracket 10, an operation pedal mechanism 20, a rotation lever 50, a small collision lever 60, and a pedal force detection device 80.

The pedal bracket 10 is fixed to a dash panel P. The dash panel P forms part of the vehicle and is positioned on the vehicle front side with respect to the operation pedal mechanism 20. The pedal bracket 10 includes a pair of side plates 16. The pair of side plates 16 faces each other at a predetermined interval in the vehicle width direction and is fixed to the dash panel P with bolts, or the like.

In FIGS. 1 and 2, among the pair of side plates 16, only the side plate 16 on the left side in the vehicle width direction is illustrated, and the side plate on the right side in the vehicle width direction is not illustrated. The same also applies to FIGS. 4 to 6 described later.

An operating rod 90 protrudes from the dash panel P to the vehicle rear side. An end portion of the operating rod 90 positioned on the vehicle front side with respect to the dash panel P is coupled to the operation pedal mechanism 20 with a clevis 70 and a clevis pin 71. The operating rod 90 is displaced toward the vehicle front side in association with stepping operation on a step portion 21 of the operation pedal mechanism 20, so that the operation force at the time of the stepping operation is transmitted to a braking device or a control device that controls the driving state of the vehicle via a hydraulic circuit, an electronic circuit, or the like.

The operation pedal mechanism 20 is arranged between the pair of side plates 16 of the pedal bracket 10. The operation pedal mechanism 20 is a link type operation pedal mechanism and mainly has the step portion 21, a first arm 22, a link member 30, a second arm 40, an operation shaft portion 11, and an intermediate shaft portion 12.

The first arm 22 is made of metal and is rotatably supported relative to the pedal bracket 10 at an upper end portion 22A in a longitudinal direction which is a direction in which the first arm 22 extends by the operation shaft portion 11 penetrating the first arm 22 in the vehicle width direction. The step portion 21 is provided at a lower end portion 22B of the first arm 22 in the longitudinal direction. With this configuration, when a driver of the vehicle steps on the step portion 21 toward the vehicle front side (hereinafter referred to as "stepping operation"), the first arm 22 is allowed to rotate about the operation shaft portion 11 toward the vehicle front side. Note that in FIG. 1, the step portion 21 is at an initial position in a state of the stepping operation being not performed.

As illustrated in FIG. 2, the second arm 40 is a thin metal plate-shaped member and has an offset portion 40A, an intermediate portion 40B, and a lower end portion 40C formed continuously in a longitudinal direction which is a direction in which the second arm 40 extends. The offset portion 40A is a portion extending from the intermediate portion 40B in the longitudinal direction of the second arm 40 in such a manner as to be offset to the vehicle rear side. With this configuration, the vehicle upper side of the second arm 40 is in an inverted L-shape formed by the offset portion 40A and the intermediate portion 40B.

As illustrated in FIG. 2, a boss 41 through which the intermediate shaft portion 12 penetrates is formed at the lower end portion 40C of the second arm 40. The intermediate shaft portion 12 is a shaft portion rotatably supporting the second arm 40 relative to the pedal bracket 10. In the lower end portion 40C, a through-hole 42 through which a link pin 31 of the link member 30 penetrates is formed on the intermediate portion 40B side (i.e., vehicle upper side) with respect to the boss 41. Note that the intermediate shaft portion 12 is arranged between the pair of side plates 16 in a state of being substantially horizontal and substantially parallel with the vehicle width direction with respect to the operation shaft portion 11.

A clearance hole 43 which is an opening penetrating the second arm 40 in the vehicle width direction is formed in the intermediate portion 40B. In the intermediate portion 40B, a bearing hole 44 through which a first rotation shaft portion 13 penetrates is formed on the offset portion 40A side (i.e., vehicle upper side) with respect to the clearance hole 43. A through-hole 45 through which a swaging pin 15 described later penetrates is formed in the offset portion 40A.

The link member 30 is a member that couples the first arm 22 and the second arm 40 to each other. The link member 30 couples the first arm 22 and the second arm 40 to each other in such a manner that the link pin 31 penetrates through the first arm 22, and the link pin 32 penetrates through the through-hole 42 of the second arm 40. With this configuration, the operation pedal mechanism 20 is configured to transmit rotation of the first arm 22 at the operation shaft portion 11 by the stepping operation on the step portion 21 through the link member 30 so that the second arm 40 can rotate at the intermediate shaft portion 12.

The rotation lever 50 is rotatably attached to the second arm 40. As illustrated in FIG. 2, the rotation lever 50 is a thin metal plate-shaped member and has a lower end portion 50C, an intermediate portion 50B, and a first contact portion 50A formed continuously in a longitudinal direction in which the rotation lever 50 extends. The intermediate portion 50B is a portion having an arrangement region on which the pedal force detection device 80 can be arranged. The arrangement region is a region not overlapping with the second arm 40 when the rotation lever 50 is arranged on the second arm 40, in other words, a region of the intermediate portion 50B of the rotation lever 50 not overlapping with the offset portion 40A. The first contact portion 50A is a portion bent and extending from the intermediate portion 50B to the vehicle rear side in the longitudinal direction of the rotation lever 50.

As illustrated in FIG. 2, a clevis holding member 51 on which the clevis 70 is held is fixed to the lower end portion 50C. Details of the clevis holding member 51 will be described later. In the lower end portion 50C, a bearing hole 52 through which the first rotation shaft portion 13 penetrates is formed on the intermediate portion 50B side (i.e., vehicle upper side) with respect to the clevis holding member 51 in the longitudinal direction of the rotation lever 50. The first rotation shaft portion 13 is a shaft that rotatably supports the rotation lever 50 relative to the second arm 40. A bearing hole 53 through which a second rotation shaft portion 14 penetrates is formed in the intermediate portion 50B. The second rotation shaft portion 14 is a shaft that rotatably supports the small collision lever 60 relative to the rotation lever 50. Specifically, in the rotation lever 50, the bearing hole 53 for the second rotation shaft portion 14 is formed on the vehicle upper side with respect to the arrangement region where the pedal force detection device 80 is arranged. In other words, the arrangement region is formed between the bearing hole 52 for the first rotation shaft portion 13 and the bearing hole 53 for the second rotation shaft portion 14.

The small collision lever 60 is rotatably supported on the rotation lever 50. The small collision lever 60 is a thin metal plate-shaped member and has a lower end portion 60C, an intermediate portion 60B, and a second contact portion 60A formed continuously in a longitudinal direction in which the small collision lever 60 extends. The second contact portion 60A is a portion bent and extending from the intermediate portion 60B to the vehicle rear side.

A through-hole 61 through which the swaging pin 15 penetrates is formed in the lower end portion 60C of the small collision lever 60. The swaging pin 15 is a shaft for fixing the small collision lever 60 to the second arm 40 which is a component of the operation pedal mechanism 20. A through-hole 62 through which the second rotation shaft portion 14 penetrates is formed in the intermediate portion 60B. In the present embodiment, the swaging pin 15 is swaged so as not to fall off from the second arm 40 and the small collision lever 60. In addition, the material and diameter of the swaging pin 15 are designed such that the swaging pin 15 is broken when a predetermined load is applied to the swaging pin 15.

In the above-described configuration, the rotation lever 50 is rotatably supported relative to the second arm 40 by the first rotation shaft portion 13. The small collision lever 60 is rotatably supported relative to the rotation lever 50 by the second rotation shaft portion 14. The swaging pin 15 penetrates through the second arm 40 and the small collision lever 60 to restrict rotation of the small collision lever 60 at the second rotation shaft portion 14. With this configuration, the rotation lever 50 is fixed to the second arm 40 via the small collision lever 60 whose rotation at the second rotation shaft portion 14 is restricted by the swaging pin 15. As a result, the rotation lever 50 can be rotated in the same direction as the rotation direction of the second arm 40 in association with rotation of the second arm 40 at the intermediate shaft portion 12.

Figure 3:
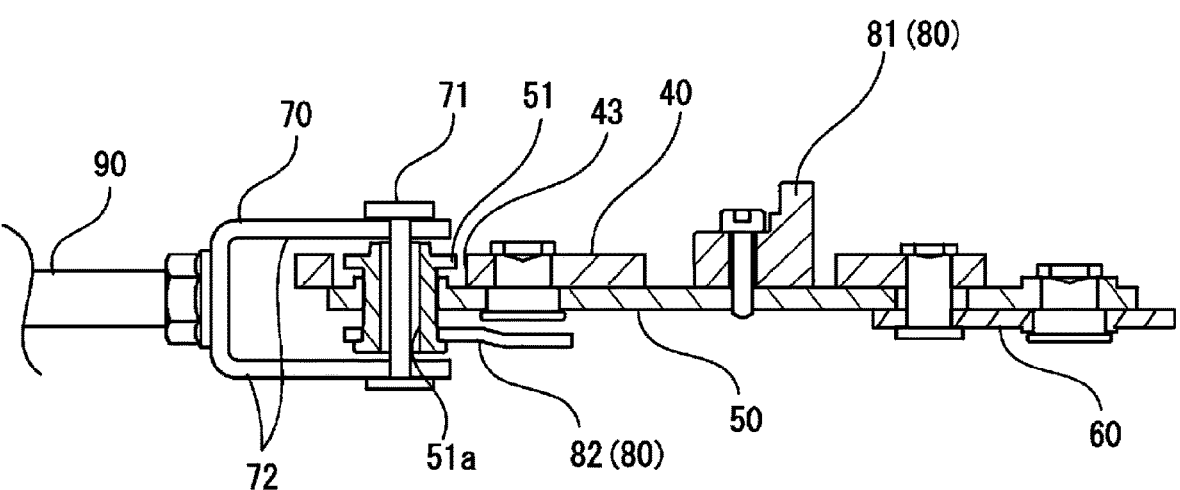
FIG. 3 is a view illustrating a section of the brake pedal device taken along a line A-A in FIG. 1.
Figure 3:
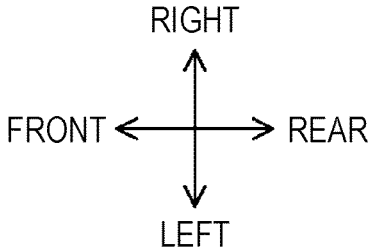

FIG. 3 illustrates a section of the brake pedal device 1 taken along a line A-A in FIG. 1. The clevis 70 is fixed to the tip end of the operating rod 90. The clevis 70 is swingably held via the clevis pin 71 by the clevis holding member 51 housed in the clearance hole 43 of the second arm 40. Specifically, the clevis holding member 51 has a through-hole 51a through which the clevis pin 71 penetrates. The inner diameter of the through-hole 51a of the clevis holding member 51 is greater than the diameter of the clevis pin 71. The clevis 70 has a pair of side plate portions 72, and the clevis pin 71 penetrates through the clevis 70 together with the clevis holding member 51 in a state where the second arm 40 and the clevis holding member 51 positioned in the clearance hole 43 of the second arm 40 are sandwiched by the pair of side plate portions 72. Note that a tip end portion of the clevis pin 71 penetrating through the side plate portions 72 is configured not to fall off from the clevis holding member 51 and the clevis 70 by a clip, or the like. With this configuration, when a reactive force is applied from the operating rod 90 to the clevis 70, the clevis 70 can swing in a direction in which the operating rod extends (i.e., the direction of the reactive force) by an amount corresponding to a clearance between the through-hole 51a of the clevis holding member 51 and the clevis pin 71.

As illustrated in FIGS. 1 and 2, the pedal force detection device 80 is attached to the intermediate portion 50B of the rotation lever 50, and when the stepping operation is performed on the step portion 21, the rotation lever 50 and the pedal force detection device 80 cooperate with each other such that a pedal force based on the stepping operation is detected.

As illustrated in FIG. 1, the pedal force detection device 80 has a pedal force SW 81 and a swing lever 82. The pedal force SW 81 is a known circuit and outputs a signal corresponding to the pedal force according to the amount of pressing of a detection shaft. The pedal force SW 81 is fixed to the intermediate portion 50B such that the detection shaft protrudes further forward of the vehicle front side than the rotation lever 50. The swing lever 82 has a receiving portion 83 facing the detection shaft of the pedal force SW 81 and is swingably held by the clevis holding member 51 by being fixed to the clevis pin 71. The receiving portion 83 of the swing lever 82 is arranged so as to face the detection shaft of the pedal force SW 81 via a spring, swings in accordance with the reactive force from the operating rod 90, and contacts the detection shaft of the pedal force SW 81. In the present embodiment, the swing lever 82 is fixed to the clevis pin 71 on the side opposite to the second arm 40 in the vehicle width direction.

(1-2) Operation of First Embodiment During Stepping Operation

When the stepping operation is performed on the step portion 21, the first arm 22 rotates about the operation shaft portion 11. At this time, the first arm 22 rotates in a predetermined direction (clockwise direction in FIG. 1) about the operation shaft portion 11, and therefore, the rotation of the first arm 22 is transmitted to the second arm 40 via the link member 30. The second arm 40 rotates in a predetermined direction (counterclockwise direction in FIG. 1) about the intermediate shaft portion 12 in association with rotation of the first arm 22. Thus, the rotation lever 50 whose rotation at the first rotation shaft portion 13 relative to the second arm 40 is restricted by the small collision lever 60 rotates in the same direction as the rotation direction of the second arm 40, and displaces the tip end of the operating rod 90 connected to the clevis 70 to the vehicle front side.

A reactive force FA from the operating rod 90 to the vehicle rear side in the direction in which the operating rod 90 extends acts on the clevis pin 71 via the clevis 70. As described above, the inner diameter of the through-hole 51a of the clevis holding member 51 is greater than the diameter of the clevis pin 71, and the clevis 70 and the swing lever 82 swing by the reactive force from the operating rod 90. With this configuration, the receiving portion 83 of the swing lever 82 contacts the detection shaft of the pedal force SW 81, and the pedal force SW 81 can detect a pedal force corresponding to the amount of push-in of the detection shaft. The pedal force SW 81 outputs a signal corresponding to the detected pedal force to a not-illustrated controller.

At this time, a load corresponding to the reactive force from the operating rod 90 acts on the swaging pin 15. For example, when the reactive force FA from the operating rod 90 acts on the clevis pin 71 by the step portion 21 being stepped on to the vehicle front side to the maximum extent by a driver of the vehicle, a first load F1 acting on the swaging pin 15 is expressed by Expression (I) below.

$$F1 = FA \times \sin\theta1 \times LA/LB \qquad \text{Expression (I)}$$

Here, θ1 is an angle at which a straight line connecting the clevis pin 71 and the swaging pin 15 intersects the direction of the reactive force FA from the operating rod 90 at the clevis pin 71. LA is a distance from the clevis pin 71 to the first rotation shaft portion 13. LB is a distance from the first rotation shaft portion 13 to the swaging pin 15.

In a case where the driver steps on the step portion 21 toward the vehicle front side to the maximum extent, and the driver further steps on the step portion 21 toward the vehicle front side, an operation load acting on the step portion 21 increases, the reactive force FA also increases, and the first load F1 also increases. Thus, in the present embodiment, the load acting on the swaging pin 15 in a case where the operation load is the maximum in design is the first load F1.

(1-3) Operation of First Embodiment Upon Vehicle Collision

Figure 4:
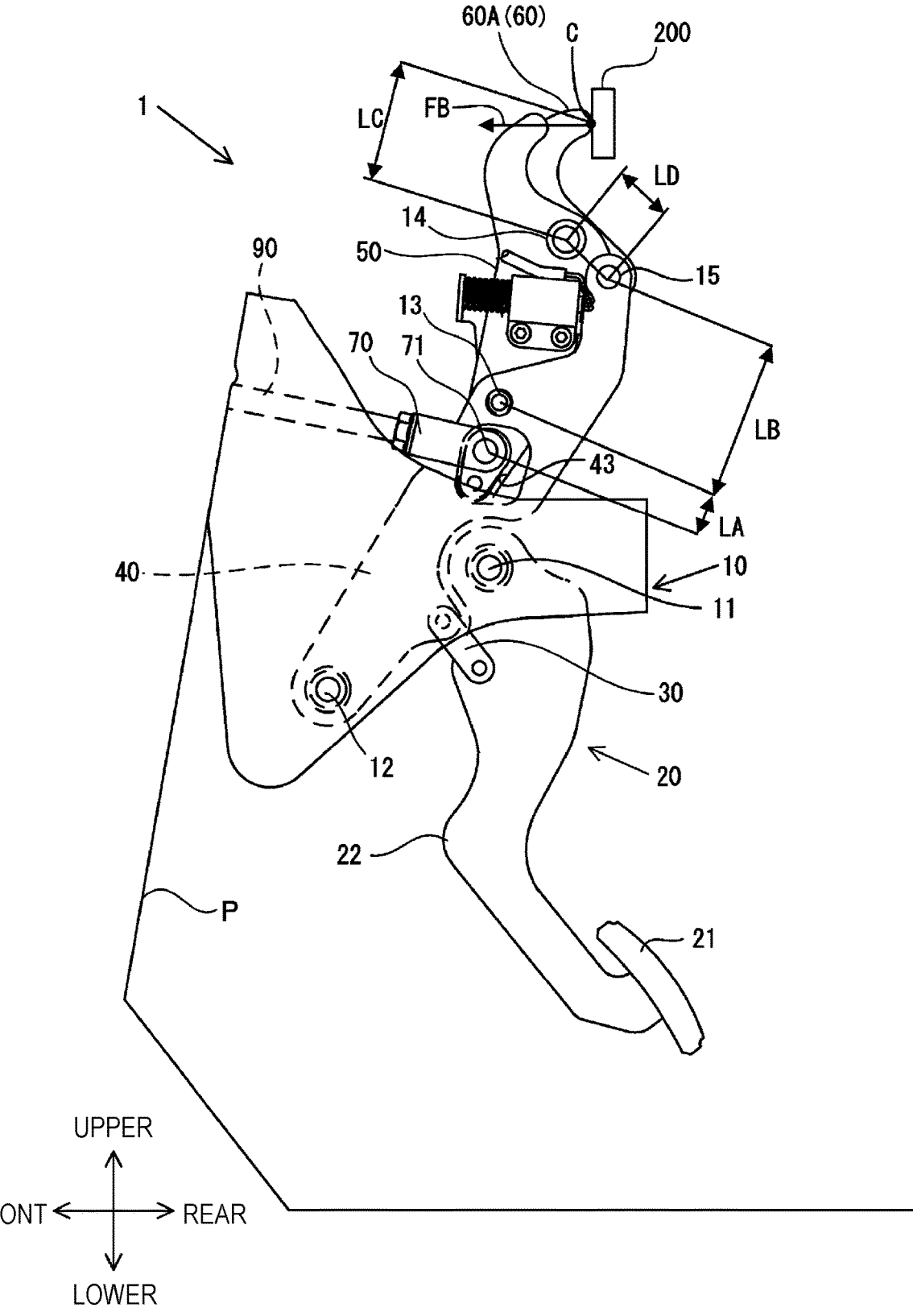
FIG. 4 is a side view illustrating the outline configuration of the brake pedal device.

As illustrated in FIG. 4, when the dash panel P is displaced to the vehicle rear side upon vehicle collision, a collision bracket 200 of an instrument panel reinforcement contacts the second contact portion 60A of the small collision lever 60. Accordingly, a load acts on the swaging pin 15. For example, in a case where a collision force FB acts on the small collision lever 60 at a contact point C at which the collision bracket 200 and the small collision lever 60 contact with each other, a second load F2 acting on the swaging pin 15 is expressed by Expression (II) below.

$$F2 = FB \times \cos\theta2 \times LC/LD \qquad \text{Expression (II)}$$

Here, θ2 is an angle at which a straight perpendicular line connecting the contact point C and the swaging pin 15 to each other intersects the direction of the collision force FB at the contact point C of the small collision lever 60. LC is a distance from the second rotation shaft portion 14 to the contact point C. LD is a distance from the swaging pin 15 to the second rotation shaft portion 14.

A relationship between the first load F1 and the second load F2 is expressed by Expression (III) below.

$$F2 > F1 \qquad \text{Expression (III)}$$

Expression (III) indicates that by designing the respective distances LA, LB, LC, and LD such that the second load F2 is greater than the first load F1, it is possible to prevent release of the fixation between the rotation lever 50 and the second arm 40 by the swaging pin 15 during operation of the brake pedal device 1. In the present embodiment, the swaging pin 15 is designed such that a load when the swaging pin 15 is broken is the second load F2 or more.

As illustrated in FIG. 4, distances for calculating the first load F1 are the distances LA and LB between the shaft portions in the rotation lever 50, whereas the distances LC and LD for calculating the second load F2 are a distance between the contact point C and the shaft portion in the small collision lever 60 and a distance between the shaft portions in the small collision lever 60. This is because the second load F2 does not directly act on the rotation lever 50 upon vehicle collision. The shapes of the second arm 40 and the rotation lever 50 and the positions of the shaft portions can be designed within a range satisfying Expressions (I) to (III) described above.

Figure 5:
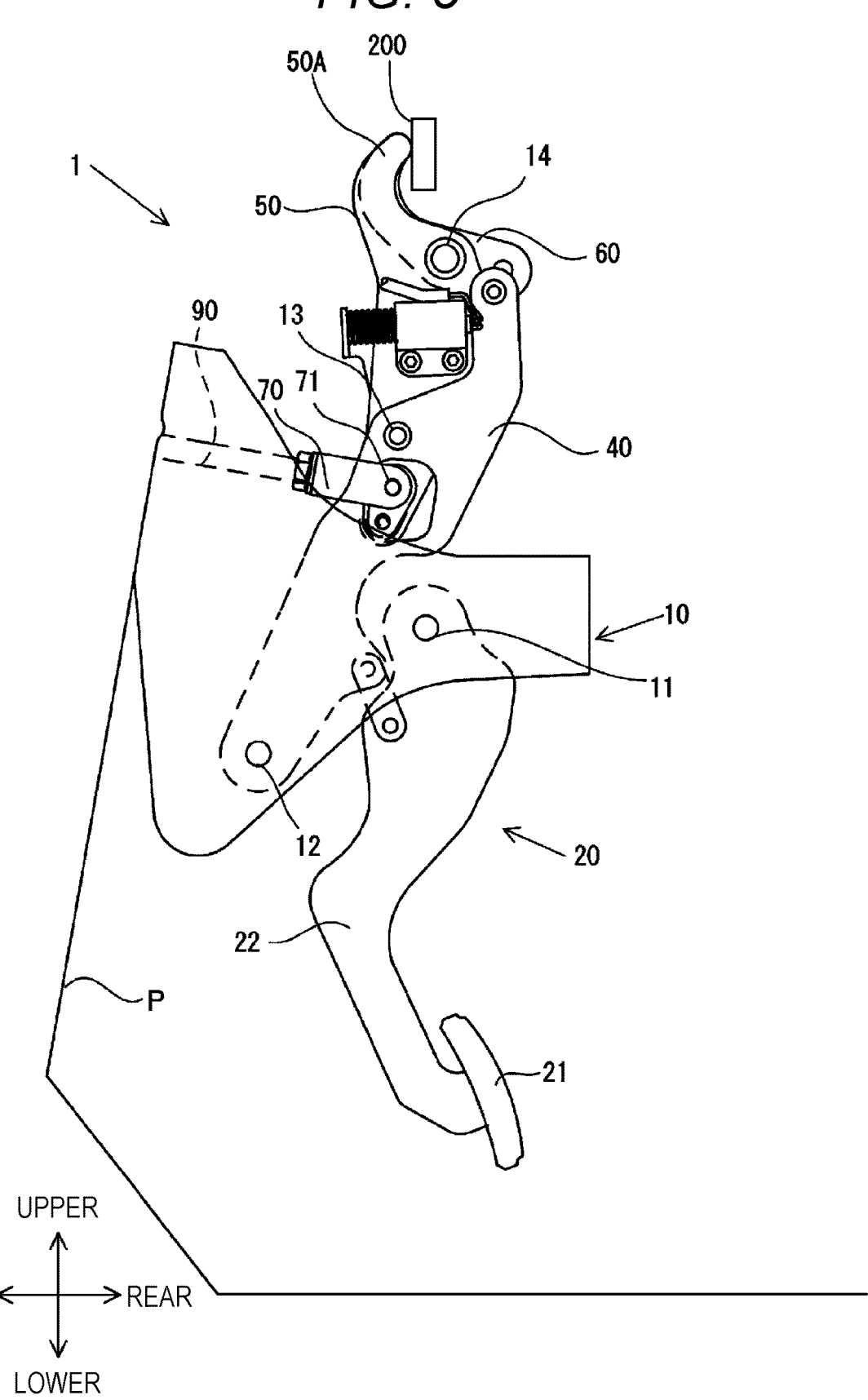
FIG. 5 is a side view illustrating the outline configuration of the brake pedal device.

When the second load F2 exceeds a reference load greater than the first load F1, the swaging pin 15 is cut off by the second load F2, the small collision lever 60 becomes rotatable at the second rotation shaft portion 14, and the fixation between the rotation lever 50 and the second arm 40 via the small collision lever 60 is released, as illustrated in FIG. 5. Thereafter, continuance of the contact of the collision bracket 200 with the second contact portion 60A of the small collision lever 60 allows the second contact portion 60A of the small collision lever 60 to rotate to the vehicle front side at the second rotation shaft portion 14 and allows the small collision lever 60 to move from a restriction position to a release position. The restriction position is a position at which in the small collision lever 60, the second contact portion 60A protrudes to the vehicle rear side beyond the first contact portion 50A. The release position is a position at which in the small collision lever 60, the second contact portion 60A is positioned on the vehicle front side with respect to the first contact portion 50A. With this configuration, the first contact portion 50A of the rotation lever 50 contacts the collision bracket 200.

Figure 6:
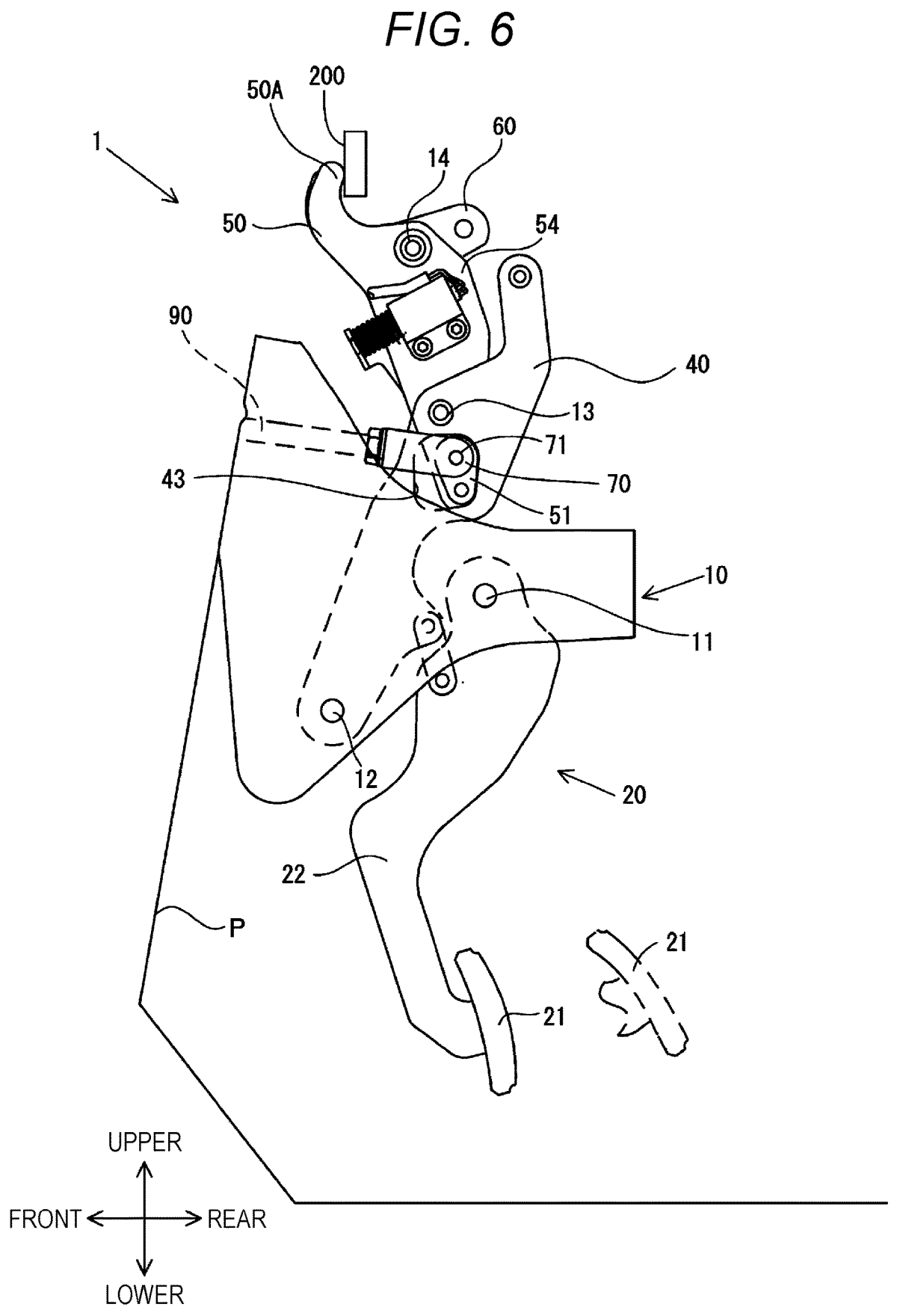

As illustrated in FIG. 6, when the collision bracket 200 contacts the first contact portion 50A, the rotation lever 50 rotates about the first rotation shaft portion 13 to the vehicle front side (counterclockwise direction in FIG. 6).

In association with the rotation lever 50, the tip end of the operating rod 90 is displaced toward the vehicle front side via the clevis 70. Since the second arm 40 rotates about the intermediate shaft portion 12 toward the vehicle front side (counterclockwise direction in FIG. 6) in response to rotation of the rotation lever 50, the step portion 21 of the first arm 22 is displaced to the vehicle front side. Note that the step portion 21 indicated by a chain double-dashed line indicates an initial position of the step portion 21 when the stepping operation is not performed.

Further, along with rotation of the rotation lever 50 at the intermediate shaft portion 12, the clevis holding member 51 housed in the clearance hole 43 rotates about the first rotation shaft portion 13, inside the clearance hole 43. In the present embodiment, the first rotation shaft portion 13 is positioned on the vehicle upper side with respect to a line segment in a direction in which the operating rod 90 extends when the small collision lever 60 is at the restriction position and the step portion 21 is at an initial position at which the stepping operation is not performed on the step portion 21. In other words, the first rotation shaft portion 13 is positioned on the vehicle upper side with respect to the clearance hole 43 of the second arm 40 in which the clevis holding member 51 is housed.

It is assumed that in the second arm 40, the first rotation shaft portion 13 is on the vehicle rear side with respect to the clearance hole 43. In this case, the movement locus of the clevis holding member 51 in association with rotation of the rotation lever 50 upon vehicle collision shifts in an arc shape toward the vehicle lower side centered on the first rotation shaft portion 13. Thus, the second arm 40 needs to be formed with the arc-shaped clearance hole 43 facing the vehicle lower side according to the movement locus of the clevis holding member 51. However, in the second arm 40, the dimension of the intermediate portion 40B on the vehicle lower side increases in order to ensure the thickness around the clearance hole 43, and for example, it may be necessary to shift the position of the first arm 22 through which the operation shaft portion 11 penetrates, to the vehicle lower side. In contrast, in the present embodiment, in the second arm 40, the first rotation shaft portion 13 is positioned on the vehicle upper side with respect to the clearance hole 43. Thus, the movement locus of the clevis holding member 51 shifts to the vehicle rear side centered on the first rotation shaft portion 13 in accordance with rotation of the rotation lever 50. Thus, the clearance hole 43 facing the vehicle rear side according to the movement locus of the clevis holding member 51 is formed in the second arm 40. With this configuration, it is easy to ensure the thickness around the clearance hole 43 without increasing the dimensions of the intermediate portion 40B of the second arm 40 toward the vehicle lower side. Thus, the position of the second arm 40 and the position of the operation shaft portion 11 of the first arm 22 are less likely to interfere with each other, and therefore, an increase in the dimension of the brake pedal device 1 can be suppressed.

In the present embodiment, the second arm 40 is an example of an operation lever. The small collision lever 60 is an example of a differential lever. The swaging pin 15 is an example of a fixing member. The clevis 70 is an example of a coupling member. The clevis holding member 51 is an example of a holding member. The pedal bracket 10 is an example of a support member. The dash panel P is an example of a first vehicle component, and the collision bracket 200 is an example of a second vehicle component.

(1-4) Summary of First Embodiment

In the brake pedal device 1 described above, when the collision bracket 200 contacts the second contact portion 60A of the small collision lever 60 and the second contact portion 60A is displaced toward the release position, accordingly, the swaging pin 15 is broken due to a load applied to the swaging pin 15, and fixation of the rotation lever 50 to the second arm 40 via the small collision lever 60 is released. At this time, the small collision lever 60 contacts the collision bracket 200, and thus the second load F2 upon vehicle collision does not directly act on the rotation lever 50. Thereafter, when the collision bracket 200 contacts the first contact portion 50A of the rotation lever 50, the rotation lever 50 rotates to the vehicle front side at the first rotation shaft portion 13, and the step portion 21 of the first arm 22 rotates to the vehicle front side accordingly. Thus, the distances LA, LB for calculating the first load F1 acting on the swaging pin 15 upon operation of the step portion 21 and the distances LC, LD for calculating the second load F2 acting on the swaging pin 15 upon vehicle collision can be determined independently. As a result, the degree of flexibility in design can be increased for the shapes of the second arm 40 and the rotation lever 50 and the positions of the shaft portions.

The clevis holding member 51 holds the clevis 70 on the rotation lever 50 in a state of being housed in the clearance hole 43 of the second arm 40. The first rotation shaft portion 13 is positioned on the vehicle upper side with respect to the line segment in the direction in which the operating rod 90 extends when the small collision lever 60 is at the restriction position and the step portion 21 is at the initial position at which the stepping operation is not performed on the step portion 21. With this configuration, it is easy to ensure the thickness around the clearance hole 43 in the second arm 40. The shape of the second arm 40 can be designed without increasing the dimensions of the second arm 40, and therefore, an increase in the dimensions of the brake pedal device 1 can be suppressed.

The clevis holding member 51 holds the clevis 70 on the intermediate portion of the rotation lever such that the clevis 70 can swing in a direction in which the reactive force from the operating rod 90 is applied, and holds the swing lever 82 of the pedal force detection device 80 such that the swing lever 82 swings together with the clevis 70. With this configuration, also in the brake pedal device 1 including the pedal force detection device 80, the degree of flexibility in design can be increased for the shapes of the second arm 40 and the rotation lever 50 and the positions of the shaft portions.

The swaging pin 15 penetrates through the offset portion 40A of the second arm 40. With this configuration, in a state of the rotation lever 50 being fixed to the second arm 40 via the small collision lever 60, a region not overlapping with the second arm 40 can be formed in the rotation lever 50, and an arrangement space for the pedal force SW 81 etc. can be ensured without increasing the dimensions of the rotation lever 50.

(2-1) Outline of Second Embodiment

In a second embodiment, configurations different from those of the first embodiment will be mainly described. In the second embodiment, the same elements as those of the first embodiment are denoted by the same reference numerals, and description of the same elements will not be repeated.

In the first embodiment described above, upon vehicle collision, the swaging pin 15 is broken to release the fixation between the rotation lever 50 and the second arm 40 via the small collision lever 60. Instead, in the present embodiment, upon vehicle collision, the small collision lever 60 and the swaging pin 15 are disengaged from each other to release the fixation between the rotation lever 50 and the second arm 40 via the small collision lever 60. In the present embodiment, the swaging pin 15 is an example of an engagement shaft portion.

Figure 7:
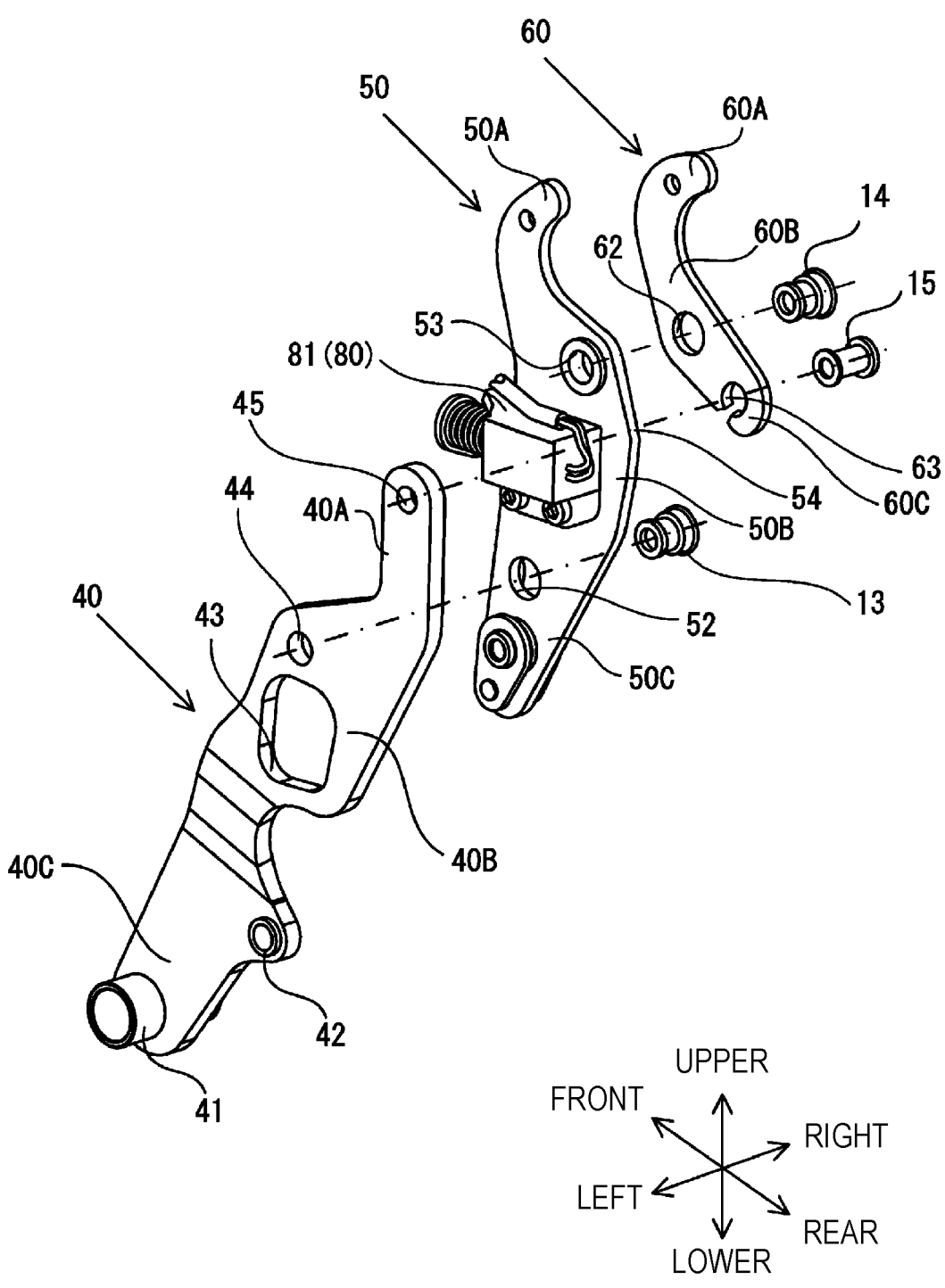
FIG. 7 is an exploded view of part of a brake pedal device according to a second embodiment.

As illustrated in FIG. 7, a cutout 63 to be engaged with the swaging pin 15 is formed in the lower end portion 60C of the small collision lever 60. The cutout 63 has a shape in which the edge of the lower end portion 60C on the vehicle front side is cut out, and the inner diameter of the cutout 63 is a size allowing penetration of the swaging pin 15.

In the present embodiment, when the small collision lever 60 is at the restriction position, the swaging pin 15 at the offset portion 40A of the second arm 40 is positioned on the vehicle rear side with respect to the second rotation shaft portion 14. Specifically, the position of the swaging pin 15 at the offset portion 40A is determined such that a straight line connecting the first rotation shaft portion 13 and the swaging pin 15 is perpendicular to a straight line connecting the second rotation shaft portion 14 and the swaging pin 15.

When the small collision lever 60 is at the restriction position, the swaging pin 15 is engaged with the cutout 63, so that the rotation lever 50 and the second arm 40 are fixed via the small collision lever 60. On the other hand, when the collision bracket 200 contacts the second contact portion 60A of the small collision lever 60, the small collision lever 60 is at the release position, and the swaging pin 15 and the cutout 63 are disengaged from each other. At this time, immediately after the start of rotation of the small collision lever 60, the cutout 63 moves between the vehicle rear side and the vehicle upper side along the straight line connecting the first rotation shaft portion 13 and the swaging pin 15, so that the swaging pin 15 can be quickly removed from the cutout 63. As a result, without breaking the swaging pin 15, the rotation lever 50 and the second arm 40 fixed via the small collision lever 60 can be released, the rotation lever 50 can be rotated at the first rotation shaft portion 13, and the step portion 21 can be displaced to the vehicle front side.

In the present embodiment described above, upon vehicle collision, the fixation between the rotation lever 50 and the second arm 40 via the small collision lever 60 can be released without breaking the swaging pin 15. Thus, the shapes of the second arm 40 and the rotation lever 50 and the positions of the shaft portions can be designed without considering, e.g., the breaking load of the swaging pin 15, and the degree of flexibility in design can be increased.

When the small collision lever 60 is at the restriction position, the position of the swaging pin 15 at the second arm 40 is determined such that the straight line connecting the first rotation shaft portion 13 and the swaging pin 15 is perpendicular to the straight line connecting the second rotation shaft portion 14 and the swaging pin 15. With this configuration, immediately after the start of rotation of the small collision lever 60, the cutout 63 moves between the vehicle rear side and the vehicle upper side along the straight line connecting the first rotation shaft portion 13 and the swaging pin 15, so that the swaging pin 15 can be easily removed from the cutout 63 and operation failure at the time of prevention of backward movement can be reduced in the brake pedal device 1.

(2-2) Modification of Second Embodiment

Figure 8:
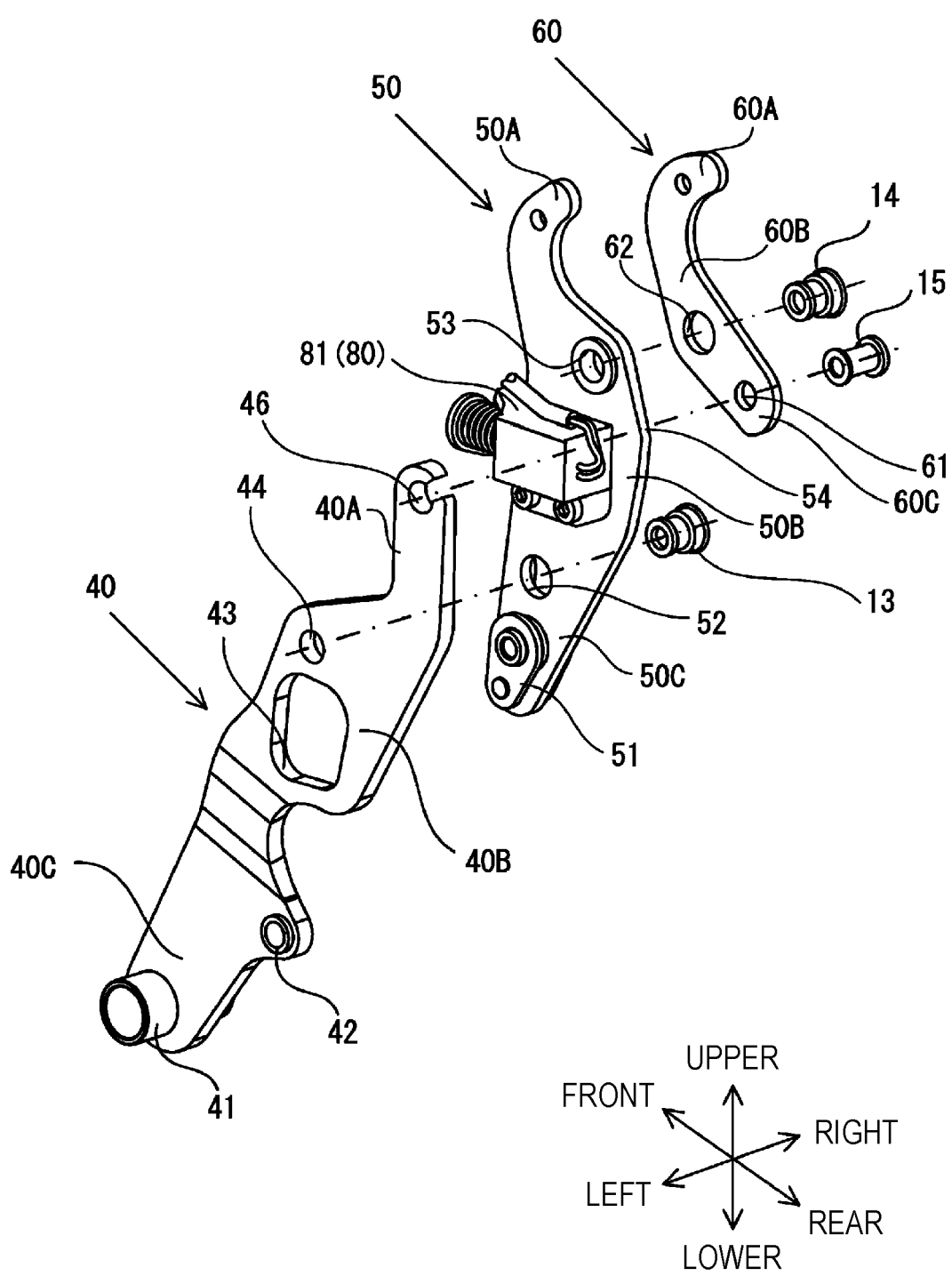
FIG. 8 is an exploded view of part of a brake pedal device according to a modification of the second embodiment.

By providing a cutout in the second arm 40, the fixation between the rotation lever 50 and the second arm 40 via the small collision lever 60 may be released upon vehicle collision. As illustrated in FIG. 8, a cutout 46 to be engaged with the swaging pin 15 is formed in the offset portion 40A of the second arm 40. The cutout 46 has a shape in which the edge of the offset portion 40A on the vehicle rear side is cut out, and the inner diameter of the cutout 46 is a size allowing penetration of the swaging pin 15.

In the present embodiment, when the small collision lever 60 is at the restriction position, the swaging pin 15 penetrating through the small collision lever 60 is engaged with the cutout 46 of the second arm 40, so that the rotation lever 50 and the second arm 40 are fixed via the small collision lever 60. On the other hand, when the collision bracket 200 contacts the second contact portion 60A of the small collision lever 60, the lower end portion 60C is rotated about the second rotation shaft portion 14 to the vehicle rear side, together with the swaging pin 15. Also in the present embodiment, immediately after the start of rotation of the small collision lever 60, the cutout 63 moves between the vehicle rear side and the vehicle upper side along the straight line connecting the first rotation shaft portion 13 and the swaging pin 15, so that the swaging pin 15 can be quickly removed from the cutout 46. With this configuration, the fixation between the rotation lever 50 and the second arm 40 via the small collision lever 60 is released, the rotation lever 50 is rotated at the first rotation shaft portion 13, and the step portion 21 is displaced to the vehicle front side.

(3) Other Embodiments

The technology disclosed in the present specification is not limited to the above-described embodiments, and can be modified into various forms without departing from the gist of the technology disclosed in the present specification and, for example, can be modified as follows.

In the above-described embodiments, the swaging pin 15 is used as the fixing member. Instead, the rotation lever 50 and the second arm 40 may be fixed to each other or released from each other by a bolt and a nut.

In the above-described embodiments, the brake pedal device 1 includes the pedal force detection device 80. Instead, the brake pedal device 1 does not necessarily include the pedal force detection device 80.

In the above-described embodiments, in the operation pedal mechanism 20, the first arm 22 and the second arm 40 are coupled to each other by the link member 30. Instead, the operation pedal mechanism 20 may include only the first arm. In this case, the first arm rotatably supports the rotation lever 50 at the first rotation shaft portion 13, and the first arm is fixed to the rotation lever 50 via the swaging pin 15 at an upper end portion of the first arm.

In the above-described embodiments, the first arm 22 is a brake pedal, but may be a pedal (e.g., accelerator pedal or clutch pedal) used for vehicles.

The material of each of the components of the brake pedal device 1 is not limited to metal, and each of the components may be made of resin.

LIST OF REFERENCE SIGNS

1 Brake Pedal Device
10 Pedal Bracket
11 Operation Shaft Portion
12 Intermediate Shaft Portion
15 Swaging Pin
20 Operation Pedal Mechanism
21 Step Portion
22 First Arm
30 Link Member
40 Second Arm
40A Offset Portion
50 Rotation Lever
50A First Contact Portion
51 Clevis Holding Member
54 Cutout
60 Small Collision Lever
60A Second Contact Portion
70 Clevis
80 Pedal Force Detection Device
81 Pedal Force SW
82 Swing Lever
90 Operating Rod
200 Collision Bracket
P Dash Panel

The invention claimed is:
1. A vehicular operation pedal device, comprising:
a support member fixed to a first vehicle component;
an operation pedal mechanism provided on the support member and having a step portion that is rotatable relative to the support member and an operation lever that rotates toward a vehicle front side when the step portion is stepped on toward the vehicle front side;

13 a rotation lever having a first contact portion extending to a vehicle rear side, supported on a vehicle lower side with respect to the first contact portion by a first rotation shaft portion so as to be rotatable toward the vehicle front side relative to the operation lever, and holding an operating rod protruding to the vehicle rear side from the first vehicle component;

a differential lever having a second contact portion extending to the vehicle rear side and supported on the vehicle lower side with respect to the second contact portion so as to be rotatable toward the vehicle front side relative to the rotation lever by a second rotation shaft portion;

a fixing member that fixes the differential lever and the operation lever, wherein the differential lever is, when fixed to the operation lever by the fixing member, at a restriction position at which the second contact portion protrudes to the vehicle rear side beyond the first contact portion of the rotation lever, and a coupling member fixed to a tip end of the operating rod; and a holding member holding the coupling member on the rotation lever, wherein the operation lever has a clearance hole, the holding member holds the coupling member on the rotation lever in a state of being housed in the clearance hole of the operation lever, the first rotation shaft portion is positioned on a vehicle upper side with respect to a line segment in a direction in which the operating rod extends when the differential lever is at the restriction position and the step portion is at an initial position at which stepping operation is not performed on the step portion, when the first vehicle component is displaced toward the vehicle rear side upon vehicle collision, a second vehicle component positioned on the vehicle rear side with respect to the first vehicle component contacts the second contact portion, so that the second contact portion is positioned on the vehicle front side with respect to the first contact portion, and the differential lever is displaced to a release position at which a load corresponding to contact of the second vehicle component with the second contact portion is applied to the fixing member, and fixation between the differential lever and the operation lever by the fixing member is released, so that the second vehicle component contacts the first contact portion and the rotation lever rotates toward the vehicle front side at the first rotation shaft portion.

2. The vehicular operation pedal device according to claim 1, wherein the fixing member has an engagement shaft portion penetrating through the operation lever in a vehicle width direction, and a cutout provided in the differential lever and cut out on the vehicle front side, and the fixing member fixes the differential lever and the operation lever by engagement of the engagement shaft portion with the cutout.

3. The vehicular operation pedal device according to claim 2, wherein a position of the engagement shaft portion is set such that a straight line connecting the first rotation shaft portion and the engagement shaft portion and a straight line connecting the second rotation shaft portion and the engagement shaft portion are perpendicular to each other when the differential lever is at the restriction position.

4. The vehicular operation pedal device according to claim 1, wherein the fixing member has an engagement shaft portion penetrating through the differential lever in a vehicle width direction, and a cutout provided in the operation lever and cut out on the vehicle rear side, and the fixing member fixes the differential lever and the operation lever by engagement of the engagement shaft portion with the cutout.

5. The vehicular operation pedal device according to claim 1, further comprising:

a pedal force detection device having a swing lever that swings in response to reactive force from the operating rod and a pedal force switch that detects a pedal force applied to the step portion based on a swing amount of the swing lever, wherein the holding member holds the coupling member on the rotation lever such that the coupling member swings in a direction in which the reactive force from the operating rod is applied, and the swing lever is swingably held by the holding member together with the coupling member.

6. The vehicular operation pedal device according to claim 1, wherein the operation lever has, at an end portion on a vehicle upper side, an offset portion extending so as to be offset to the vehicle rear side with respect to the first rotation shaft portion, and the fixing member is positioned at the offset portion.

7. A vehicular operation pedal device, comprising:

a support member fixed to a first vehicle component;

an operation pedal mechanism provided on the support member and having a step portion that is rotatable relative to the support member and an operation lever that rotates toward a vehicle front side when the step portion is stepped on toward the vehicle front side;

a rotation lever having a first contact portion extending to a vehicle rear side, supported on a vehicle lower side with respect to the first contact portion by a first rotation shaft portion so as to be rotatable toward the vehicle front side relative to the operation lever, and holding an operating rod protruding to the vehicle rear side from the first vehicle component;

a differential lever having a second contact portion extending to the vehicle rear side and supported on the vehicle lower side with respect to the second contact portion so as to be rotatable toward the vehicle front side relative to the rotation lever by a second rotation shaft portion; and a fixing member that fixes the differential lever and the operation lever, wherein the differential lever is, when fixed to the operation lever by the fixing member, at a restriction position at which the second contact portion protrudes to the vehicle rear side beyond the first contact portion of the rotation lever, the fixing member has an engagement shaft portion penetrating through the operation lever in a vehicle width direction, and a cutout provided in the differential lever and cut out on the vehicle front side, the fixing member fixes the differential lever and the operation lever by engagement of the engagement shaft portion with the cutout, and a position of the engagement shaft portion is set such that a straight line connecting the first rotation shaft portion and the engagement shaft portion and a straight line connecting the second rotation shaft portion and the engagement shaft portion are perpendicular to each other when the differential lever is at the restriction position.

\* \* \* \* \*